Jan. 16, 1923.                                              1,442,700
                    S. H. PHELPS.
            DEPTH GAUGE FOR DISK HARROWS.
                  FILED FEB. 28, 1922.
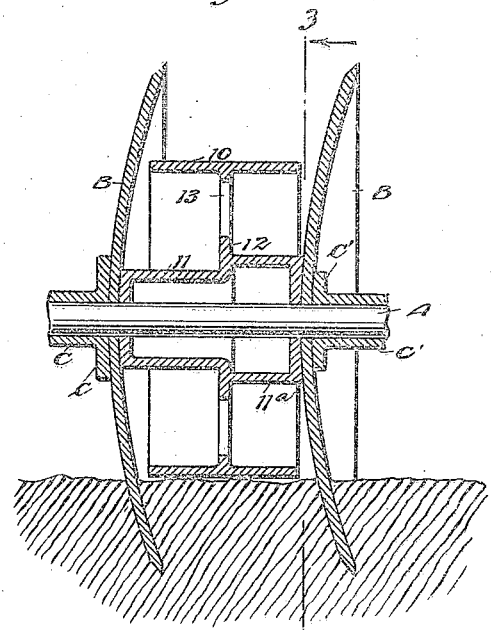
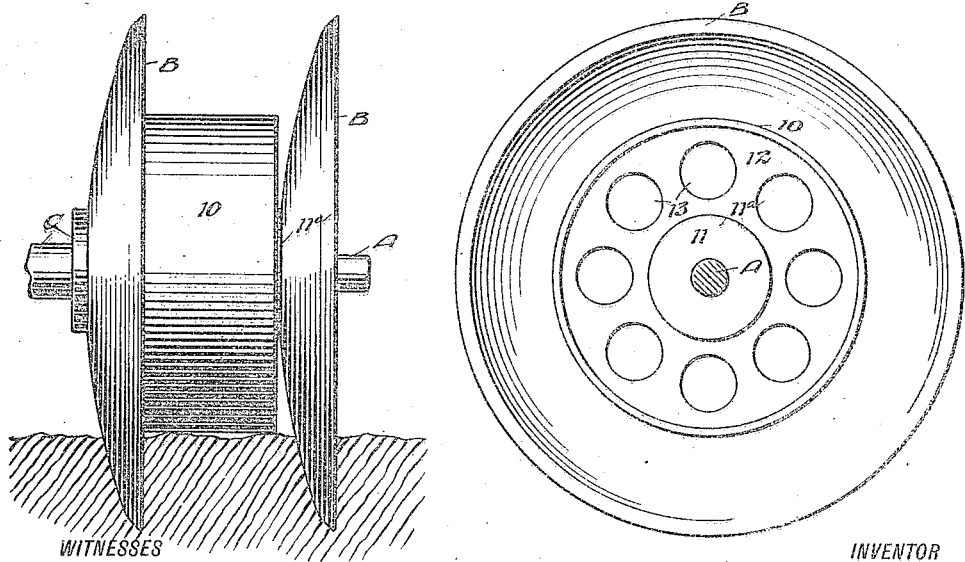
WITNESSES
Edw. Thorpe
J. L. McAuliffe
INVENTOR
Spencer H. Phelps
BY
Munn & Co.
ATTORNEYS Patented Jan. 16, 1923.

1,442,700

UNITED STATES PATENT OFFICE.

SPENCER HERMANUS PHELPS, OF EVANSVILLE, INDIANA, ASSIGNOR TO BLOUNT PLOW WORKS, OF EVANSVILLE, INDIANA, A CORPORATION OF INDIANA.

DEPTH GAUGE FOR DISK HARROWS.

Application filed February 28, 1922. Serial No. 539,980.

*To all whom it may concern:*

Be it known that I, SPENCER HERMANUS PHELPS, a citizen of the United States, and a resident of Evansville, in the county of Vanderburg, and State of Indiana, have invented a new and Improved Depth Gauge for Disk Harrows, of which the following is a description.

With the usual arrangement of disk harrows a spool or thimble of comparatively small diameter is employed between each pair of disks to space the same on the axle.

The general object of my invention is to provide a depth gauge to be emplaced on the axle at spaced intervals between certain pairs of the harrow disks.

The nature of the invention and its distinctive features and characteristics will more clearly appear as the description proceeds.

Reference is to be had to the accompanying drawings forming a part of this specification, it being understood that the drawings are merely illustrative of one example of the invention.

Figure 1 is a vertical section of a depth gauge embodying my invention showing the same emplaced on an axle illustrated in part, said depth gauge being disposed beneath a pair of disks, fragments of thimbles being shown on the axle in positions alternating with the depth gauge;

Figure 2 is an elevation of the parts shown in Figure 1;

Figure 3 is a vertical section on the line 3—3, Figure 1.

In the illustrated example A indicates a fragment of a harrow axle; B, harrow disks; and C, C' fragments of thimbles. In accordance with my invention I provide between two disks B a depth gauge designated generally by the numeral 10 and comprising a broad rim rigid with a hub 11 through the medium in the illustrated example of a web 12 having openings 13 to reduce weight. The gauge 15 has a rim surface sufficiently broad to prevent the same from sinking in the ground and the device has a sufficient radius to determine the depth to which the disks B penetrate the ground. Preferably the hub 11 is formed of enlarged diameter 11ª at one end and the ends are respectively concaved and convexed to conform to the convex and concave surfaces of the disks. Each disk B is held between an end of the depth gauge 10 and an end flange on the thimble C or C'. The end bearing surface of the hub 11 and of the adjacent thimble C or C' are of different areas the one being a greater area than the other. At the right of Figure 1 I have shown the flange of the thimble C' smaller than the end surface of the adjacent hub end 11ª while adjacent the opposite end of the hub 11, which is the smaller end, the flange c of the thimble C is larger than said hub end. The broader surfaces are opposed to the direction of pressure.

I would state in conclusion that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:

1. A depth gauge for disk harrows having a hub presenting a bore to be fitted on an axle between harrow disks, and a rim sustained radially outward from said hub and having a broad area to ride on the surface of the ground, one end of said hub having a greater diameter than the other, said end of larger diameter having a concave end bearing surface to contact with the convex side of a harrow disk.

2. A depth gauge for disk harrows comprising a radially extending flange carrying at its outer circumference a substantially broad rim adapted to roll over the earth surface, said flange merging at its inner edge into a hub member presenting a concave surface at one end and a convex surface at the other, the concave end of said hub engaging the convex side of a disk harrow and the convex end engaging the concave side of an adjacent disk harrow, said hub being substantially longer than the width of said rim to permit the same to form a spacing between the disk harrows and the edges of the rim.

SPENCER HERMANUS PHELPS.